Dec. 11, 1923.
L. N. FAUBION
1,477,049
YARD METER FOR HEMSTITCHING MACHINES
Filed Feb. 11, 1922  2 Sheets-Sheet 1
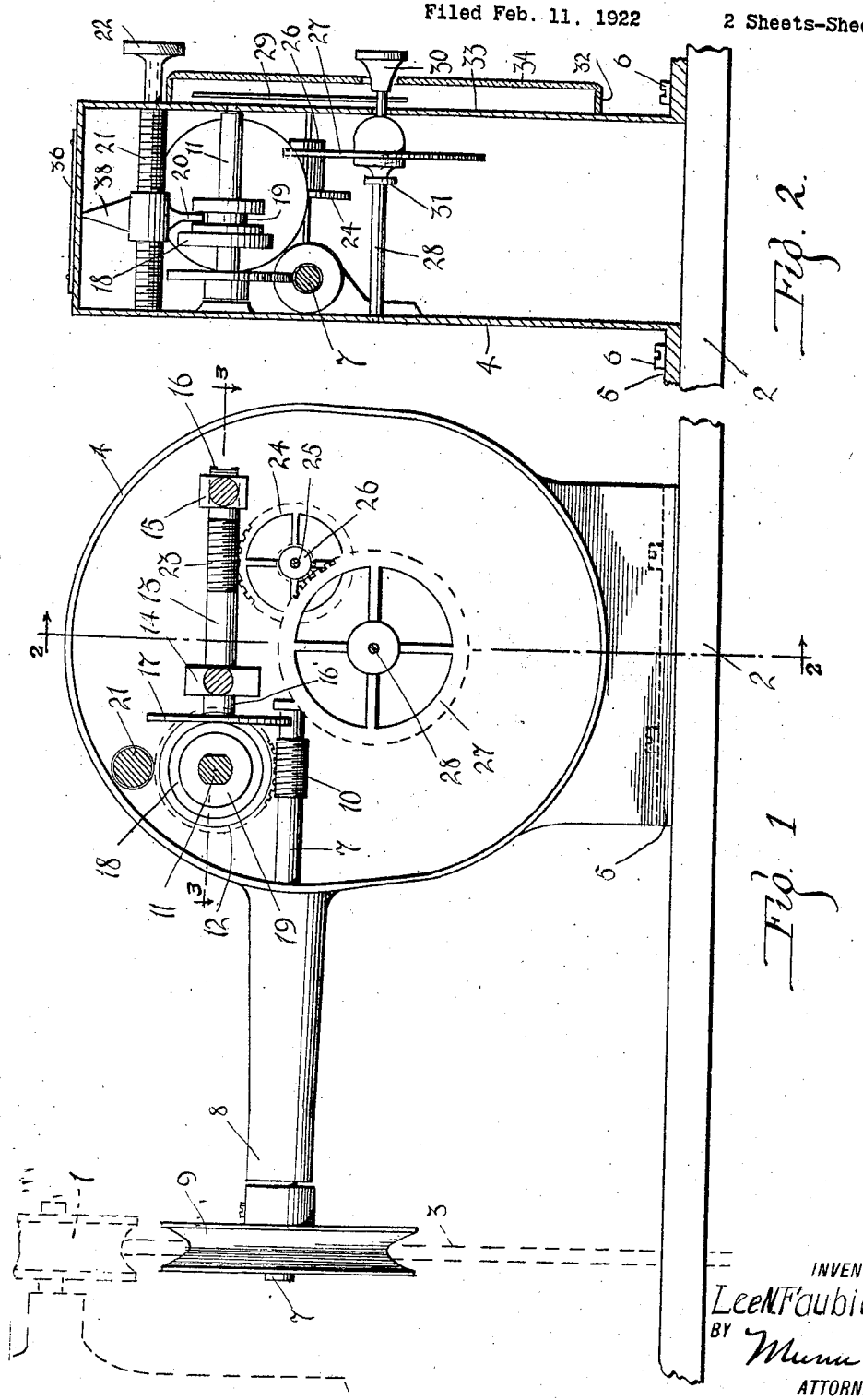
INVENTOR
Lee N Faubion
BY
ATTORNEYS Dec. 11, 1923.          1,477,049
L. N. FAUBION
YARD METER FOR HEMSTITCHING MACHINES
Filed Feb. 11, 1922     2 Sheets-Sheet 2
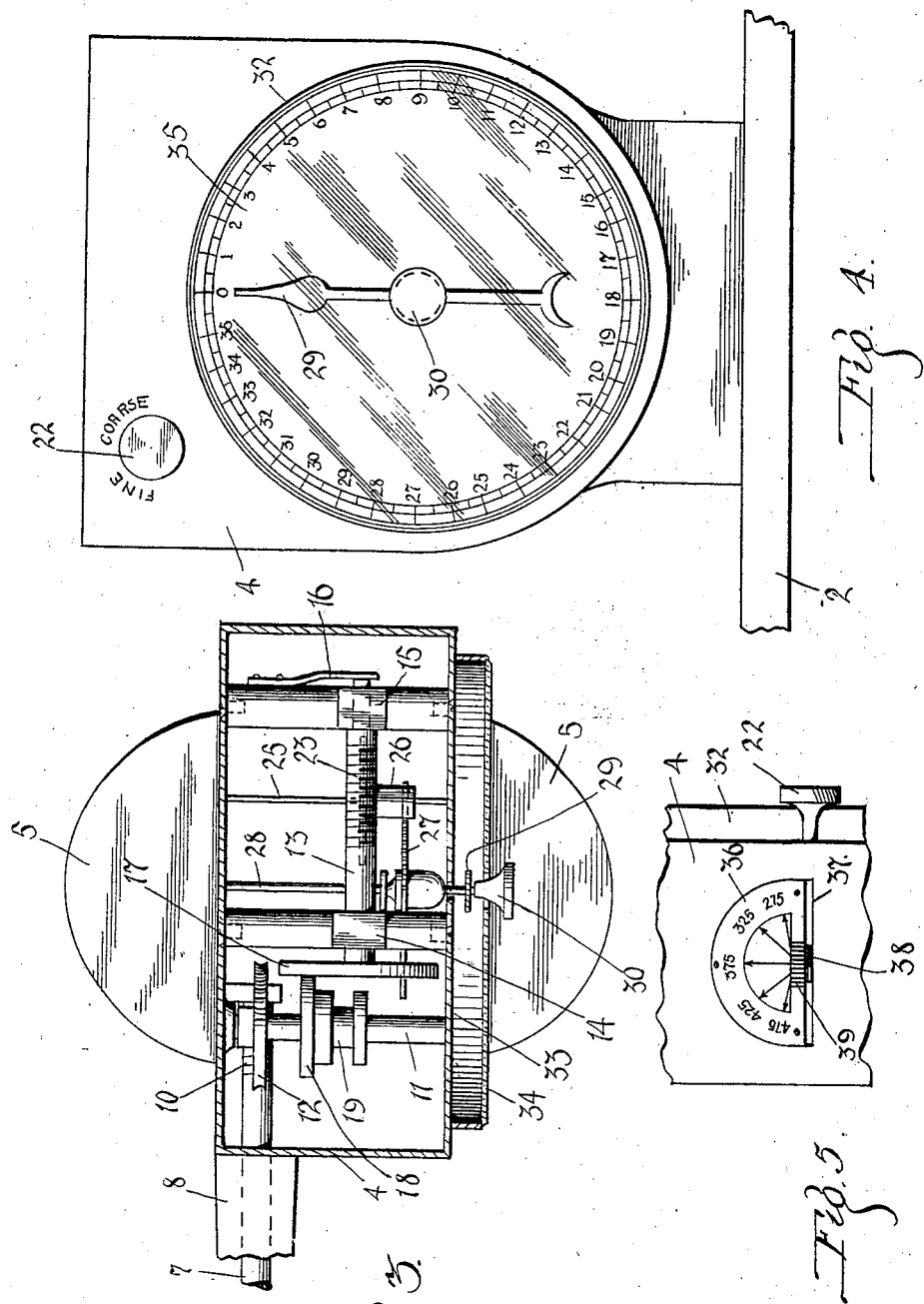
INVENTOR
Lee N. Faubion
BY
ATTORNEYS Patented Dec. 11, 1923.

1,477,049

UNITED STATES PATENT OFFICE.

LEE N. FAUBION, OF FAIRBURY, NEBRASKA.

YARD METER FOR HEMSTITCHING MACHINES.

Application filed February 11, 1922. Serial No. 535,750.

*To all whom it may concern:*

Be it known that I, LEE N. FAUBION, a citizen of the United States, and a resident of Fairbury, in the county of Jefferson and State of Nebraska, have invented a new and useful Improvement in Yard Meters for Hemstitching Machines, of which the following is a full, clear, and exact description.

My invention relates to improvements in yard meters for hemstitching machines, and it consists in the combinations, constructions and arrangements herein described and claimed.

An object of my invention is to provide a device of the character described which may be quickly and easily attached to the ordinary type of hemstitching machine and detached therefrom.

A further object of my invention is to provide a device of the character described for accurately measuring and registering the linear yardage of goods passing through the hemstitching machine.

A further object of my invention is to provide a device of the character described which may be adjusted for coarse or fine hemstitching.

Other objects and advantages will appear in the following specification, and the novel features of the invention will be particularly pointed out in the appended claim.

My invention is illustrated in the accompanying drawings, forming part of this application, in which Fig. 1 is a sectional view of an embodiment of my invention, Fig. 2 is a sectional view along the line 2—2 of Fig. 1, Fig. 3 is a sectional view along the line 3—3 of Fig. 1, Fig. 4 is a front elevation of the mechanism illustrated in Fig. 1, showing the dial.

Fig. 5 is a fragmentary view of the casing showing the stitch indicator.

In carrying out my invention, I make use of the ordinary type of hemstitching machine, the drive wheel of which is shown at 1 and which machine is mounted upon a table or platform 2. A belt 3 is provided for driving the drive wheel 1 of the machine.

My indicating mechanism is housed within a casing 4, which casing is mounted by means of a base 5 upon the platform 2 and secured thereto by bolts 6. A spindle 7 is rotatably mounted in a sleeve 8 extending outwardly from the casing 4. A pulley wheel 9 is carried at the end of the spindle 7 and arranged to engage the belt 3 and be driven thereby. As the belt 3 drives the hemstitching machine, it will also drive the pulley wheel 9 which in turn will operate the mechanism of the yard meter disposed in the casing 4.

The opposite end of the spindle 7 is arranged to extend within the casing 4 and terminates adjacent its inner end in the threaded portion 10, which serves as a worm gear. A short rotatably mounted shaft 11 is disposed directly above and transverse to the worm gear 10. The shaft 11 is supported by the walls of the casing 4. A worm wheel 12 is carried by the shaft 11 directly above the worm gear 10 and its teeth are in mesh with the worm gear 10 so that the spindle 7, when turned, will drive the shaft 11.

A second relatively short shaft 13 is rotatably mounted within the casing 4 and supported at one end by a bearing 14 and at its other end by a smaller bearing 15, which bearing also includes a tension band spring 16 for delivering a forward thrust to the shaft 13, the purpose for which will be hereinafter described.

Means for driving the shaft 13 by the shaft 11 is provided in a variable friction transmission comprising a plate 17 carried and centrally supported upon the inner end of the shaft 13. A friction wheel 18 is carried by the shaft 11 and is feathered thereon so that the wheel may move laterally upon the shaft 11. Means for moving the friction wheel 18 upon the shaft 11 so that it will engage the plate 17, pressed thereagainst by the spring 16 at various points from its center to the periphery thereof, is provided in a grooved collar 19 disposed on one side of the wheel 18. A finger 20 extends into the groove of the collar 19 and is supported for movement upon a threaded screw 21 so that rotation of the screw 21 will cause the finger 20 to move back and forth along the screw 21 carrying with it the collar 19 and the friction wheel 18. A knurled knob 22 is provided at the outer end of the screw 21 outside of the casing 4 for operating the finger 20.

The shaft 13 is provided with a worm gear 23 adjacent its rearward end, which worm gear is arranged to engage a worm wheel 24 mounted upon a shaft 25. The worm wheel 24 carries in turn at one side thereof, a pinion 26, which pinion is arranged with its teeth in mesh with a relatively large gear wheel 27 carried by a rotatably mounted shaft 28. The shaft 28 terminates at one end on the outside of the casing 4 and carries thereon a hand 29 and an adjusting knob 30. The gear wheel 27 is arranged to only frictionally engage the shaft 28. This is made possible by a friction sleeve 31 so that the hand 29 may be set without turning back or changing the position of any of the balance of the mechanism.

An annular flange 32 is supported on the outer face 33 of the casing 4 concentric the shaft 28. A cover glass 34 is supported upon the flange 32 and serves as a means for preventing damage to the hand 29 and the dial 35. The dial 35 is fixed upon the face 33 of the casing 4 and is calibrated to read in yards and subdivided to indicate one-half yards.

From the foregoing description of the various parts of the device, the operation thereof may be readily understood. The entire yard meter may be applied and fixed on the platform of the hemstitching machine by merely setting the bolts 6 and throwing the belt 3 so that it passes over the pulley wheel 9.

Let us assume that the work on the hemstitching machine is that which requires a very fine stitch, which means that the goods will pass through the machine at a slower rate of speed, while the belt 3 will travel at its usual speed. It will therefore be necessary to move the adjusting knob 22 so that the friction wheel 18 will be relatively close to the periphery of the friction plate 17, and the gear ratio greatly reduced. As the hemstitching machine operates, the belt 3 of course travels and turns with it the pulley 9. The pulley 9 causes the spindle 7 to turn and drive the shaft 11. The shaft 11 carries the friction wheel 18 which in its turn drives the plate 17 and causes the second shaft 13 to turn. The shaft 13 is directly connected by means of the worm gear 23 to the gear wheels 24 and 27 and as these wheels are driven, the shaft 28 will move and cause the hand 29 to move in a clockwise direction, indicating and registering directly the linear yardage of the goods passing through the hemstitching machine. When a coarse stitch is made on the machine, then the adjusting knob 22 is moved to the right and the friction wheel 18 is brought toward the center of the plate 17.

It will be noted that the sleeve 8 is relatively long and that the pulley 9 is remote from the casing 4. The purpose for having the pulley 9 remote from the casing 4 is to bridge the space on the platform 2 of the hem-stitching machine that is occupied by the automatic bobbin winder. Thus, the attachment of my yard meter to the hemstitching machine does not in any way hinder the operation of the bobbin winder.

An indicating mechanism for indicating the number of stitches for which the yard meter is set is disposed upon the top of the casing 4 and consists in a semi-circular dial 36, which is disposed adjacent a slot 37 through which a pointer 38 carried by the finger sleeve 20 projects. As the knob 22 is turned to set the frictional transmission, previously described, the pointer 38 will move in the slot 37 and point to one of a plurality of calibrated lines 39 at the base of a semi-circular dial 36. The dial 36 is calibrated to read in number of stitches. In this case there are eleven spaces, which spaces represent twenty-five stitches each, with five sets of numbers representing every other fifty stitches.

I claim:

The combination with a hemstitching machine, of an indicating mechanism adapted to be attached to said hemstitching machine to indicate the linear measurement of work passing through said machine, said mechanism comprising a dial having legends representing units of linear measurement, an indicating hand for said dial, a spindle adapted to be driven by said hemstitching machine, a variable speed transmission connected between said spindle and said hand, and means for manually operating said variable speed transmission calibrated in stitches per linear unit.

LEE N. FAUBION.